United States Patent [19]
Goto et al.

[11] Patent Number: 6,069,791
[45] Date of Patent: May 30, 2000

[54] COOLING DEVICE FOR NOTEBOOK PERSONAL COMPUTER

[75] Inventors: Kazuhiko Goto; Koichi Mashiko; Yuji Saito; Thang Toan Nguyen; Masataka Mochizuki; Katsuo Eguchi; Hitoshi Hasegawa, all of Tokyo, Japan

[73] Assignee: Fujikura Ltd., Tokyo, Japan

[21] Appl. No.: 08/911,056

[22] Filed: Aug. 14, 1997

[51] Int. Cl.[7] .............................. G06F 1/20; H05K 7/20
[52] U.S. Cl. .................... 361/687; 361/700; 361/818; 175/15.2; 165/104.33; 165/185; 62/259.2
[58] Field of Search .................. 361/687, 683, 361/699, 700, 818; 165/80.3, 80.4, 104.33, 185; 174/15.2, 35 R, 35 GC; 62/259.2; 349/59

[56] References Cited

U.S. PATENT DOCUMENTS

| | | | |
|---|---|---|---|
| 4,090,555 | 5/1978 | Anderson et al. | 165/76 |
| 5,313,362 | 5/1994 | Hatada et al. | 165/80.3 |
| 5,343,358 | 8/1994 | Hilbrink | 361/700 |
| 5,383,340 | 1/1995 | Larson et al. . | |
| 5,430,609 | 7/1995 | Kikinis . | |
| 5,588,483 | 12/1996 | Ishida | 165/104.33 |
| 5,606,341 | 2/1997 | Aguilera | 361/699 |
| 5,621,613 | 4/1997 | Haley et al. | 361/687 |
| 5,634,351 | 6/1997 | Larson et al. | 361/700 |
| 5,646,822 | 7/1997 | Bhatia et al. | 361/687 |
| 5,757,615 | 5/1998 | Donahoe et al. | 361/687 |
| 5,781,409 | 7/1998 | Mecredy, III | 361/687 |
| 5,796,581 | 8/1998 | Mok | 361/687 |
| 5,822,187 | 10/1998 | Garner et al. | 361/687 |
| 5,828,552 | 10/1998 | Ma | 361/687 |
| 5,832,987 | 11/1998 | Lowry et al. | 361/687 |
| 5,847,925 | 12/1998 | Progl et al. | 361/687 |

*Primary Examiner*—Leo P. Picard
*Assistant Examiner*—Lisa Lea-Edmonds
*Attorney, Agent, or Firm*—Oblon, Spivak, McClelland, Maier & Neustadt, P.C.

[57] ABSTRACT

A cooling device for a notebook personal computer which has a personal computer body accommodating an exothermic electronic element and a display hinged in an openable/closable manner to the personal computer body through a hinge mechanism, including a first heat pipe having a first end portion arranged along the display and a second end portion arranged in parallel with a center line of rotation of said hinge mechanism; a second heat pipe having a first end portion arranged on the electronic element in a heat transferable manner and a second end portion arranged in thermal contact with the second end portion of said first heat pipe; and a connector defining a first hole having an axis and configured to receive the second portion of the first heat pipe, a second hole having an axis different from the axis of the first hole and configured to receive the second portion of the second heat pipe, the first and second holes communicating with each other; wherein at least one of the second end portions is positioned on the center line of rotation of the hinge mechanism. The connector and one of the heat pipes, having a relatively rotatable second end portion, can form a hinge between the personal computer body and the display.

18 Claims, 12 Drawing Sheets

COOLING DEVICE FOR NOTEBOOK PERSONAL COMPUTER

BACKGROUND OF THE INVENTION

1. Field of the Invention

The present invention relates to a cooling device for a notebook personal computer for cooling an exothermic member such as an electronic element in a personal computer by using a heat pipe for transferring the heat as the latent heat of a working fluid.

2. Related Art

In recent years, there are remarkably widespread the so-called "portable personal computers" of notebook or sub-notebook type. In accordance with the increase in the number of functions or the improvement in the processing speed, on the other hand, the output of an electronic element such as a processing unit is rising year by year. It is, therefore, desired to improve the capacity of a cooling device for cooling the exothermic element. In the prior art, for example, there has been a cooling device which adopts a heat pipe excellent in the heat transfer ability. In the cooling device of this kind, more specifically, the heat pipe has one end portion arranged on the electronic element such as the processing unit acting as a heat source and its other end portion arranged in a heat transferable manner on an aluminum sheet, as arranged in the display for shielding the noise.

When the electronic element generates the heat as the use of the personal computer proceeds, a working fluid in a liquid phase, as confined in the container of the heat pipe, is heated and evaporated. The vapor of the working fluid flows to the other end portion under a lower internal pressure of the container, i.e., to the end portion arranged on the aluminum sheet so that it is derived of the heat and is condensed. This heat is released from the aluminum sheet to the internal space of the display and is dissipated by the natural convection from the inside of the display to the outside. The working fluid having restored the liquid phase is circulated by the gravity or the capillary pressure of a wick toward the end portion, as arranged on the electronic element, of the container until it is heated and evaporated again. As a result, the electronic element is cooled and prevented from being overheated.

Here, the notebook personal computer is earnestly desired to have a small size and a low weight because its major purpose is the portability. This severely restricts the space for the heat pipe to occupy in the internal space of the personal computer case. Usually, the display, as equipped with the aluminum sheet, is so hinged to the personal computer case as can be freely opened/closed (or erected/inclined). When the display is to be employed as the heat dissipating means, the heat transfer means such as the heat pipe has to be so constructed as can be freely bent at the connected portion between the personal computer case and the display. The heat pipe per se is excellent in the heat transfer ability but is required to have a high gas tightness for keeping its characteristics, and it is difficult to manufacture a freely bendable heat pipe.

SUMMARY OF THE INVENTION

A main object of the present invention is to provide a cooling device for a notebook personal structure capable of exemplifying the heat dissipating means by a display attached in an openable/closable manner to a personal computer case and enhancing the cooling characteristics by using a heat pipe.

Therefore, the present invention is applied to a notebook personal computer in which a display is attached in an openable/closable manner through a hinge mechanism to the personal computer body accommodating an exothermic electronic element. The structure of the invention comprises: a first heat pipe having one end portion arranged along the display; and a second heat pipe having one end portion arranged in a heat transferable manner on the electronic element. The other end portion of one heat pipe is arranged on the center axis of rotation in the hinge mechanism and is held relatively rotatably by a connector. This connector further holds the other end portion of the other heat pipe such that the heat can be transferred with the end portion of the one heat pipe. The connector is fixed on the personal computer body or display in which the other heat pipe is arranged.

When the electronic element generates heat as the personal computer body is used, this heat is transferred to the one end portion of the second heat pipe of the cooling device of the invention. Then, this heat evaporates the liquid-phase working fluid which is confined in the container of the second heat pipe. The vapor of the working fluid flows to the other end portion having the lower temperature and internal pressure of the container, i.e., to the end portion held by the connector, so that it is derived of its heat and condensed by the first heat pipe and the connector.

Since the end portion, as held by the connector, of the second heat pipe is covered integrally with the one end portion of the first heat pipe, the heat of the electronic element is transferred from the second heat pipe to the first heat pipe.

In this case, because of a large area for the heat transfer between the end portions of the individual heat pipes, the heat is efficiently transferred between the heat pipes. Here, the working fluid, as having been derived of the heat to restore the liquid phase, of the second heat pipe is circulated by the gravity or the wick to the end portion, as located at the side of the electronic element, of the container.

On the other hand, the liquid-phase working fluid of the first heat pipe is evaporated by the heat which is transmitted through the second heat pipe and the connector. The vapor of the working fluid flows toward the end portion, as arranged in the display, of the container so that it is derived of the heat by the display and condensed. In short, the heat of the electronic element is transferred through the connector to the first heat pipe. As a result, the electronic element is cooled. Moreover, the end portion, as held by the connector of the rotatably held heat pipe held is arranged on the same axis as the center axis of the hinge mechanism, so that the display can be turned (or opened/inclined) without any difficulty.

In the present invention, on the other hand, one heat pipe has an end portion held relatively rotatably by the connector, and this connector is fixed on the member in which the other heat pipe is arranged, so that these heat pipes and the connector can construct the hinge for the display.

The above and further objects and novel features of the present invention will more fully appear from the following detailed description when the same is read with reference to the accompanying drawings. It is to be expressly understood, however, that the drawings are for purposes of illustration only and are not intended as a definition of the limits of the invention.

DESCRIPTION OF THE PREFERRED EMBODIMENTS

Figure 1:
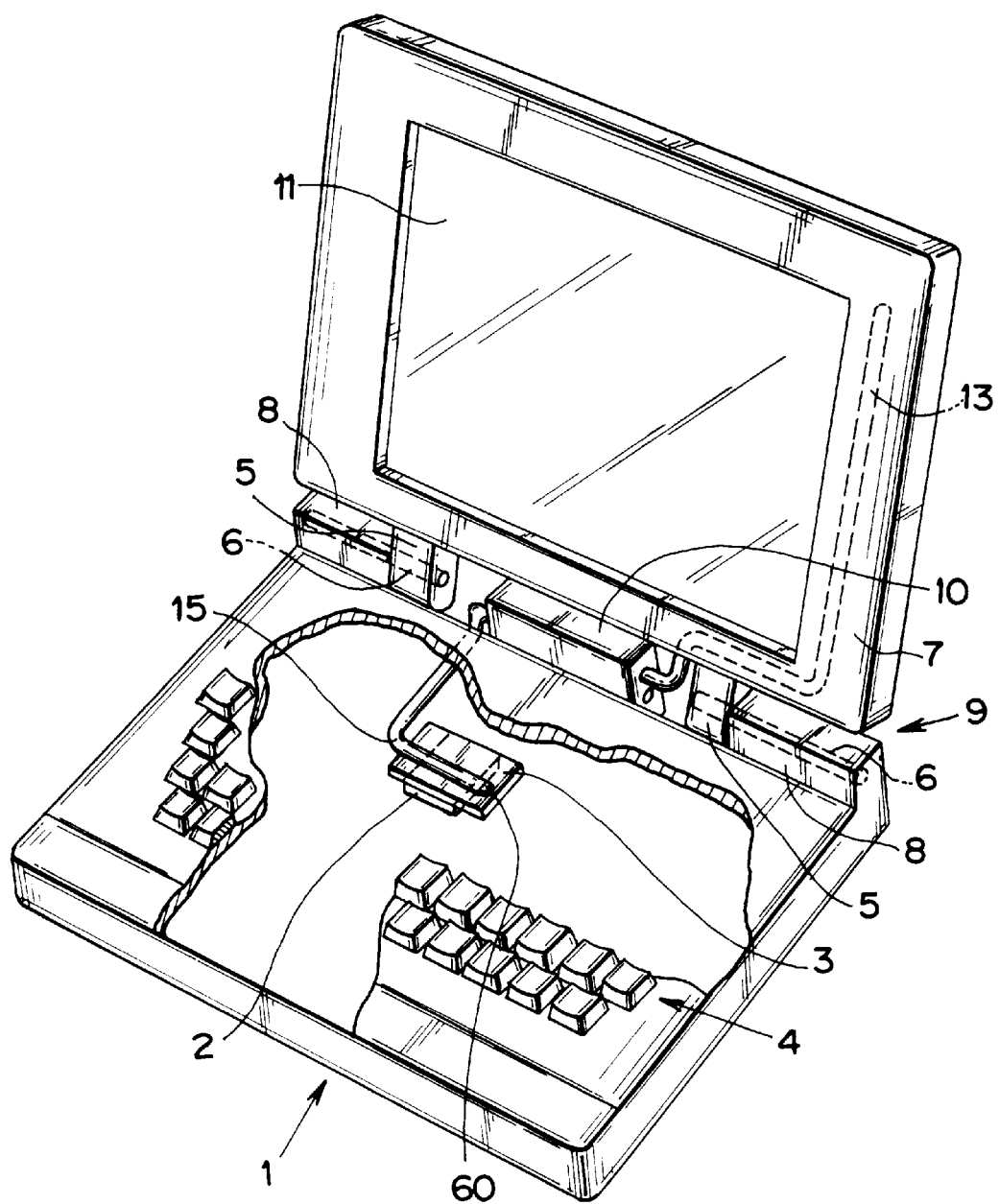
FIG. 1 is a perspective view showing a notebook personal computer according to the present invention.

The present invention will be specifically described with reference to FIGS. 1 to 4. In FIG. 1, a personal computer body 1 is a rectangular container made of a plastic panel or a metal panel of a magnesium alloy or the like and is given a size of A5 to A4 according to the JIS (Japanese Industrial Standards). On the bottom of the personal computer body 1, there is mounted a CPU (Central Processing Unit) 2 corresponding to the electronic element of the invention. A heat transfer plate 3 made of aluminum is placed on the upper face of the CPU 2.

A keyboard 4 is fitted in the upper face of the personal computer body 1. On an edge of the personal computer body 1, there are opposed two support blocks 5 which are protruded upward. Hinge pines 6 are individually rotatably supported at their one-end portions by the support blocks 5. Here, these two hinge pins 6 are so arranged that their leading ends confront each other.

The personal computer body 1 is equipped with a display 7 at its upper face. Specifically, the display 7 is formed into such a planar shape as is equipped on its one side with an image display screen 11 made of a planar liquid crystal panel. The display 7 is equipped therein with a metal sheet, as exemplified by an electromagnetic shielding sheet 14.

The display 7 is equipped, at its lower edge, as seen in FIG. 1, that is, at positions adjacent to the individual support blocks 5 of the personal computer body 1, with support blocks 8 which are protruded downward. These two support blocks 8 individually support the other end portions of the hinge pins 6 rotatably. In short, the hinge pins 6 and the four support blocks 5 and 8 constitute together a hinge 9 corresponding to the a hinge mechanism of the present invention. As a result, the display 7 is so attached to the personal computer body 1 that it can be freely opened/closed on the hinge 9 within a range of about 130 degrees.

To the personal computer body 1, as located between the support blocks 8 of the display 7, there is attached by suitable means a connector 10. This connector 10 is made of a metal block of copper or aluminum. In this connector 10, there are formed two circular holes 12 of the same size, which are extended in parallel with the axis of the hinge pins 6. These two holes 12 are vertically arranged in parallel such that the upper hole 12 has a center axis aligned with that of the hinge pins 6 and such that the individual holes 12 communicate with each other. Moreover, these holes 12 are individually made straight and extended through the connector 10 to the left and right side faces, as seen in FIG. 3.

Figure 3:
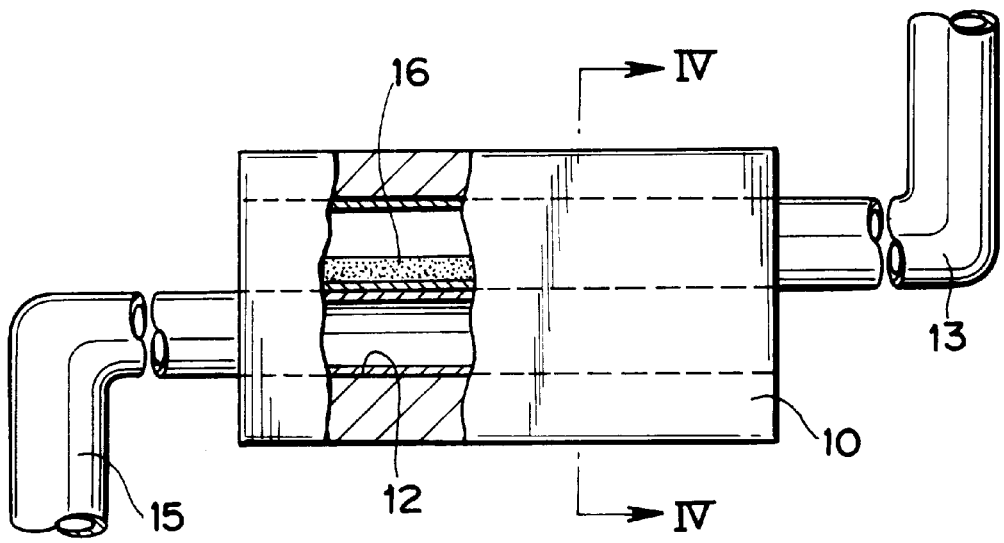
FIG. 3 is a partially cut-away schematic view showing the connector.

Into the upper hole 12, there is inserted from the right side of FIG. 3 one end portion of a first heat pipe 13. This first heat pipe 13 is prepared by confining pure water as a working fluid 16 in a copper container having a circular section and plated with hard chromium, and the external diameter of this container is set to substantially the same size of the internal diameter of the hole 12. As a result, the first heat pipe 13 is so held in the connector 10 as can rotate on its center axis. Moreover, one end portion, as arranged in the hole 12, of the first heat pipe 13 is arranged on the same axis as that of the hinge pins 6.

Figure 2:
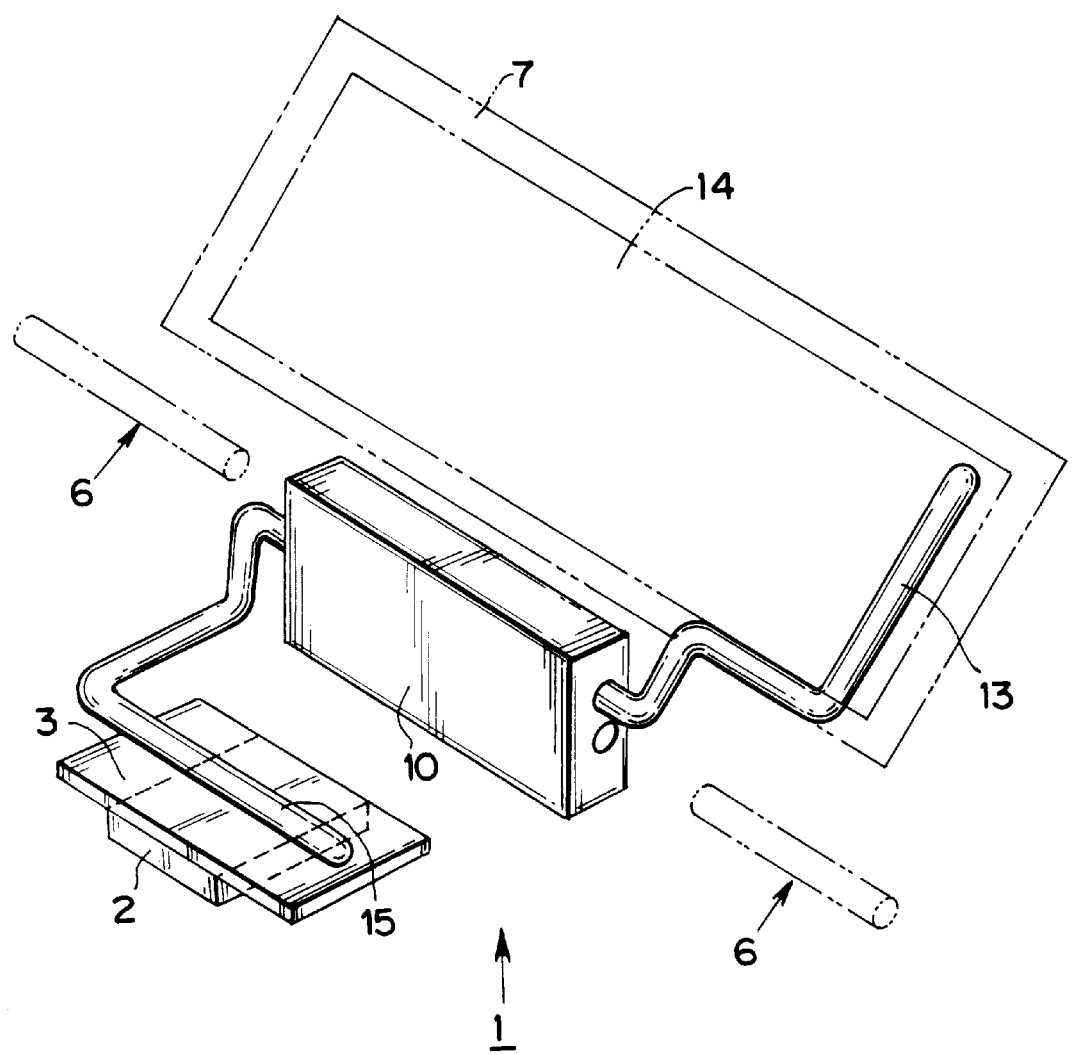
FIG. 2 is a schematic view showing an arrangement of a connector with respect to a display and a personal computer body.
Figure 6:
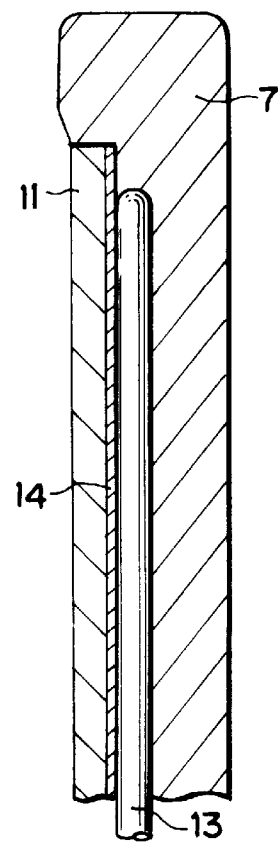
FIG. 6 is a sectional view showing the state in which the first heat pipe is arranged in an electromagnetic shielding plate.

The other end of the first heat pipe 13 is suitably folded and inserted into the display 7 and is mounted on the electromagnetic shielding sheet 14 along the right side edge thereof, as seen in FIG. 2, by the not-shown suitable means. This electromagnetic shielding sheet 14 is arranged, as shown in FIG. 6, on the back of the display screen 11 inside of the display 7.

Into the lower hole 12 of the connector 10, there is inserted from the left side of FIG. 3 one end portion of a second heat pipe 15. The other end portion of this second heat pipe 15 is so arranged in the personal computer body 1 as is folded at several portions to along the upper face of the heat transfer plate 3. Moreover, the heat transfer plate 3 and the second heat pipe 15 are fixed on each other by the not-shown suitable means. As a result, the CPU 2 and the second heat pipe 15 are so connected that they can transfer the heat. This second heat pipe 15 is prepared by confining pure water in a copper container having a circular section and plated with hard chromium.

A pasty thermal joint 38 is applied between the individual heat pipes 13 and 15 and the holes 12. When the display 7 is brought up/down, it is turned on the center axis of the first heat pipe 13 while the first heat pipe 13 contacting with the side face of the second heat pipe 15. In other words, the first heat pipe 13 and the second heat pipe 15 are held in close contact independently of the position of the display 7.

Here will be described the operations of the cooling device for the notebook personal computer thus constructed. As the personal computer is used, the heat is generated from the CPU 2 and is transferred through the heat transfer plate 3 to one end portion of the second heat pipe 15. At this instant, a temperature difference is caused between the two end portions of the second heat pipe 15 so that the heat pipe action is automatically started. Specifically, the working fluid 16 in its liquid phase, as confined in the container of the second heat pipe 15, is evaporated by the heat of the CPU 2. When the personal computer is used, the display 7 takes an erected position with respect to the personal computer body 1.

The vapor, as generated by the heat, of the working fluid 16 flows toward the end portion, as held by the connector 10, of the container of the second heat pipe 15 until its heat is absorbed by the container of the first heat pipe 13 so that it is condensed. In short, the heat is transferred from the second heat pipe 15 to the first heat pipe 13. In this case, the heat transfer from the second heat pipe 15 to the first heat pipe 13 is efficient because the first heat pipe 13 for receiving the heat is arranged over the second heat pipe 15 for releasing the heat and because the contacting portion between the first heat pipe 13 and the second heat pipe 15 is covered with the connector 10.

On the other hand, the working fluid 16, as having released the heat to restore the liquid phase, of the second heat pipe 15 is circulated to the end portion, as arranged at the side of the CPU 2, of the container by either the gravity of the capillary pressure to be established by the wick. The working fluid 16 is evaporated again by the heat of the CPU 2, as transferred through the heat transfer plate 3.

The first heat pipe 13 starts its actuation automatically when the heat is transferred thereto from the second heat pipe 15. The display 7 is erected, as described hereinbefore, so that the electromagnetic shielding sheet 14 is naturally placed in the upright position. As a result, the action mode of the first heat pipe 13 is in the bottom heat mode in which the evaporation portion is positioned below the condensation portion. More specifically, the working fluid 16 is evaporated in the inner faces of the end portion, as held by the connector 10, of the container. The vapor of the working fluid 16 flows toward the end portion, as arranged in the display 7, of the container. Then, the vapor of the working fluid 16 has its heat absorbed by the electromagnetic shielding sheet 14 so that it is condensed. In other words, the heat is transferred from the first heat pipe 13 to the electromagnetic shielding sheet 14. This heat is dissipated from the surface of the electromagnetic shielding sheet 14. The working fluid 16, as having restored the liquid phase as a result of the heat release, of the first heat pipe 13 flows down along the inner wall faces of the container. The liquid of the working fluid 16 is evaporated in the portion, as arranged in the circular hole 12 of the connector 10, of the inner face of the container by the heat of the CPU 2, as transferred through the connector 10 and the second heat pipe 15. From now on, the heat transfer cycle by the working fluid 16 like the aforementioned one is continued. As a result, the CPU is cooled so that its overheat is prevented in advance.

Moreover, the first heat pipe 13, as rotatably held by the connector 10, is arranged on the same axis as that of the hinge pins 6 so that the heat transfer between the first heat pipe 13 and the second heat pipe 15 is efficiently effected. As a result, an excellent cooling capacity can be attained no matter whether the display 7 might take an erected or inclined position.

Figure 7:
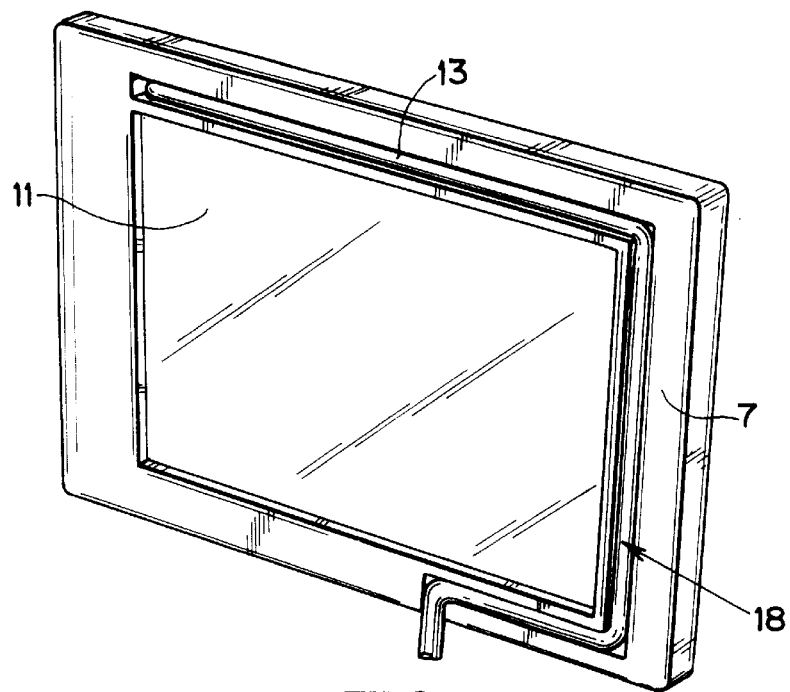
FIG. 7 is a perspective view showing the state in which the first heat pipe is arranged in the arranging portion of the display.
Figure 8:
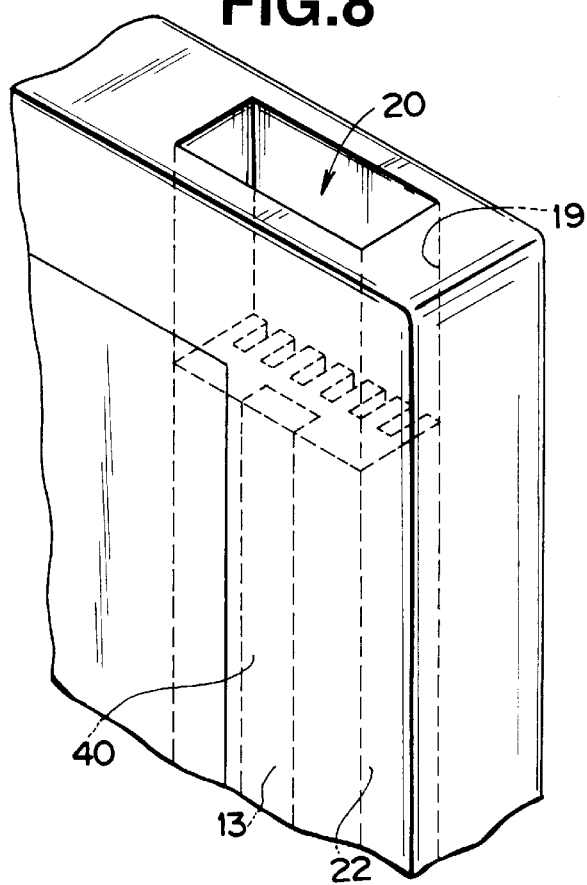
FIG. 8 is a schematic view showing an arranging relation between a cavity and an outlet.
Figure 9:
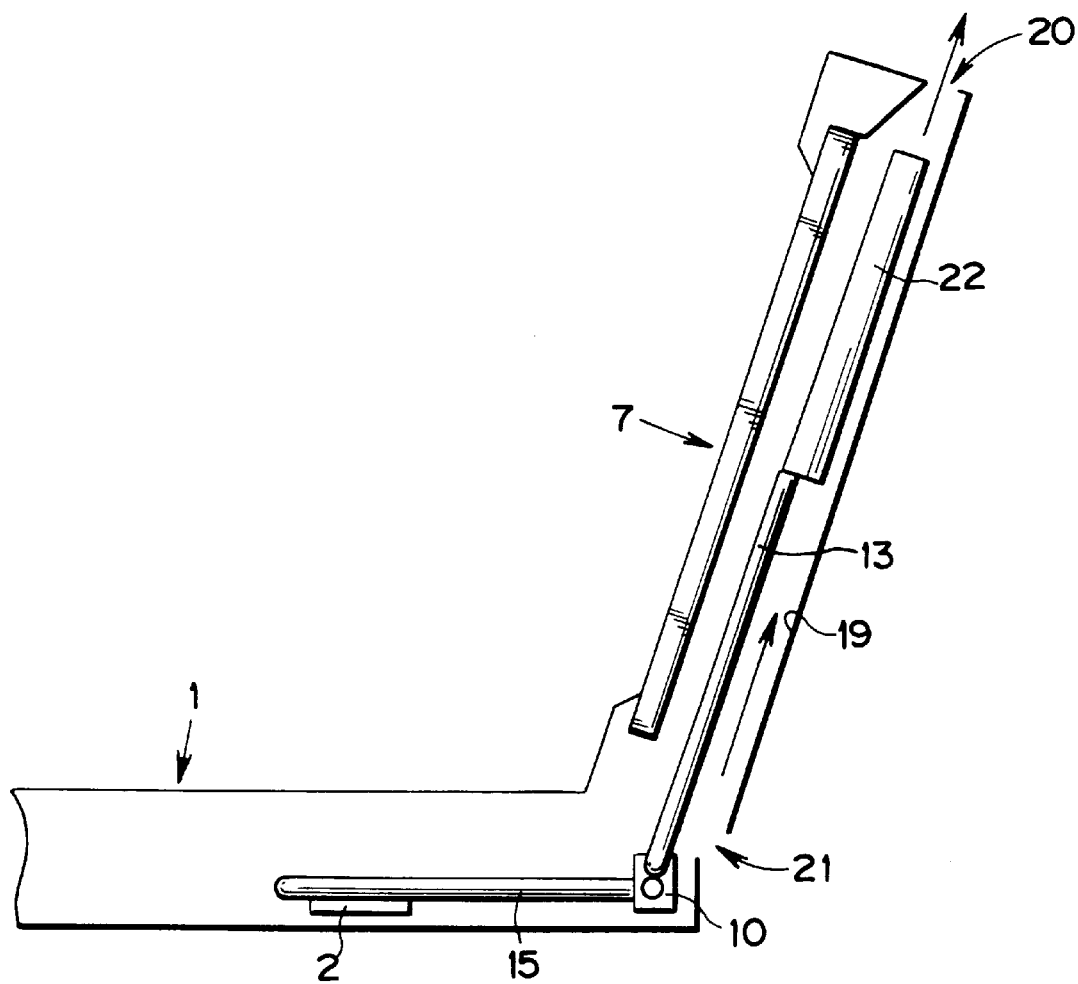
FIG. 9 is a schematic view showing an arranging relation between the cavity and an inlet in the display.
Figure 11:
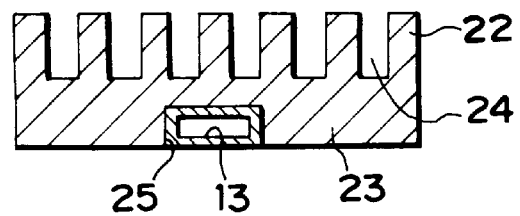
FIG. 11 is a sectional view showing a heat sink and the first heat pipe.
Figure 10:
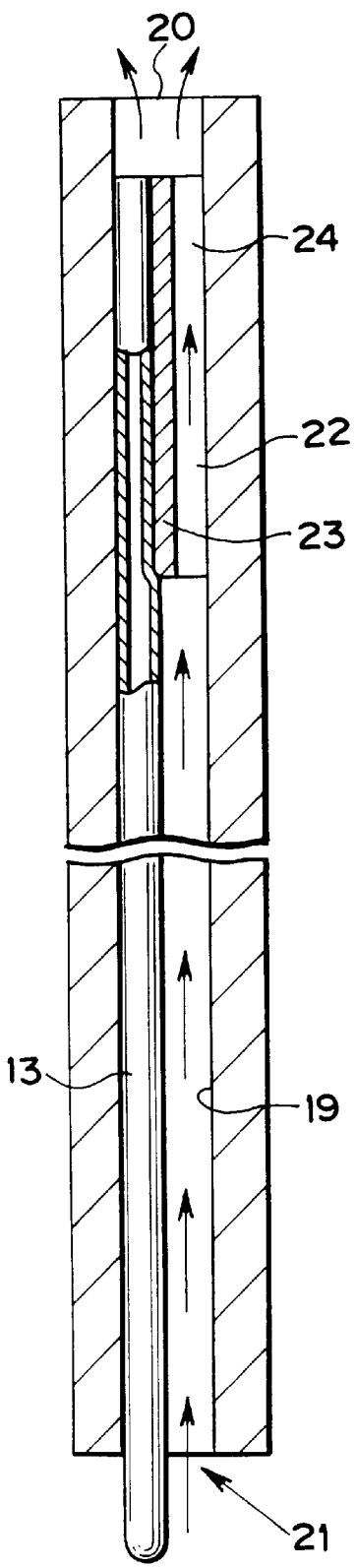
FIG. 10 is a schematic view showing the cavity and the first heat pipe.

Here will be described another embodiment in which the condensation portion of the first heat pipe 13 is exposed from the display 7. As shown in FIG. 7, the display 7 is provided at its portion along the edge portion of the image display screen 11 with an arranging portion 18. This arranging portion 18 is formed by recessing the outer face of the display 7 linearly. One end portion of the first heat pipe 13 is arranged along the arranging portion 18, and the first heat pipe 13 is fixed on the display 7 by the not-shown suitable means.

According to the cooling device thus constructed, therefore, the heat to be taken from the first heat pipe 13 is mostly dissipated unchangedly to the atmosphere. The remaining heat is transferred to the outer wall face of the display 7 until it is dissipated into the atmosphere. Since the first heat pipe 13 is exposed to the outside of the display 7 and since the display 7 acts as a dissipating face, the heat is not confined in the display 7 so that the capacity for cooling the CPU 2 is improved better than the structure of FIG. 2.

Here will be described another embodiment in which the condensation of the first heat pipe 13 is arranged in the cavity of the display 7. In the right end of the display 7, as shown in FIGS. 8 to 11, there is formed a straight cavity 19 which is directed vertically. This straight cavity 19 has a rectangular opening, for example. In the upper edge portion of the display 7, as located in FIG. 8 immediately above the cavity 19, there is formed an outlet 20 which has the same opening shape as that of the cavity 19. This outlet 20 corresponds to air discharging opening and has communication with the cavity 19.

In the lower edge portion of the display 7 immediately under the cavity 19, on the other hand, there is formed an inlet 21 which has the same opening shape as that of the cavity 19. This inlet 21 corresponds to an air introducing opening and has communication with the cavity 19. In short, the cavity 19 is constructed to extend in the vertical direction of the display 7.

In the cavity 19, there is arranged the first heat pipe 13 which is equipped at its one end portion with a heat sink 22. The end portion, as arranged in the cavity 19, of the first heat pipe 13 is crushed into a planar shape. The heat sink 22 is constructed, for example, by raising a plurality of planar fins 24 from a planar base 23. The heat sink 22 is attached in such a position to the first heat pipe 13 that the individual fins 24 are oriented in the longitudinal direction of the cavity 19. Here, the heat sink 22 and the first heat pipe 13 are integrally fixed by fitting the container of the first heat pipe 13 in a fitting groove 25 which is formed in the back of the base 23.

According to the cooling device thus constructed, therefore, the heat of the CPU 2 is carried by the working fluid 16 of the first heat pipe 13 so that it is transferred to the heat sink 22. The heat thus transferred is dissipated from the surfaces of the base 23 and the individual fins 24 into the cavity 19. The resultant hot air flows upward due to its lower specific gravity and then from the outlet 20 to the outside of the display 7. As a result of this updraft of the air in the cavity 19, the lower portion of the cavity 19 is evacuated to a lower pressure so that cavity 19 is supplied by the air outside of the display 7 by way of the inlet 21.

The air ascends along the cavity 19 and flows out, while contacting with the condensation portion and the heat sink 22 of the first heat pipe 13, from the outlet 20 to the outside of the display 7. In short, a circulating flow is established upward in the cavity 19 so that the CPU 2 is cooled. Then, the working fluid 16 having released the heat to restore the liquid phase flows down along the inner wall face of the container of the first heat pipe 13. Then, the working fluid is evaporated again by the heat of the CPU 2 on the inner face of the portion, as inserted in the hole 12 of the connector 10, of the first heat pipe 13.

As described above, the air flows upward in the cavity 19 so that the heat of the CPU, as transferred from the first heat pipe 13, can be quickly carried to the out side of the display 7. As a result, the capacity for cooling the CPU is improved.

Figure 12:
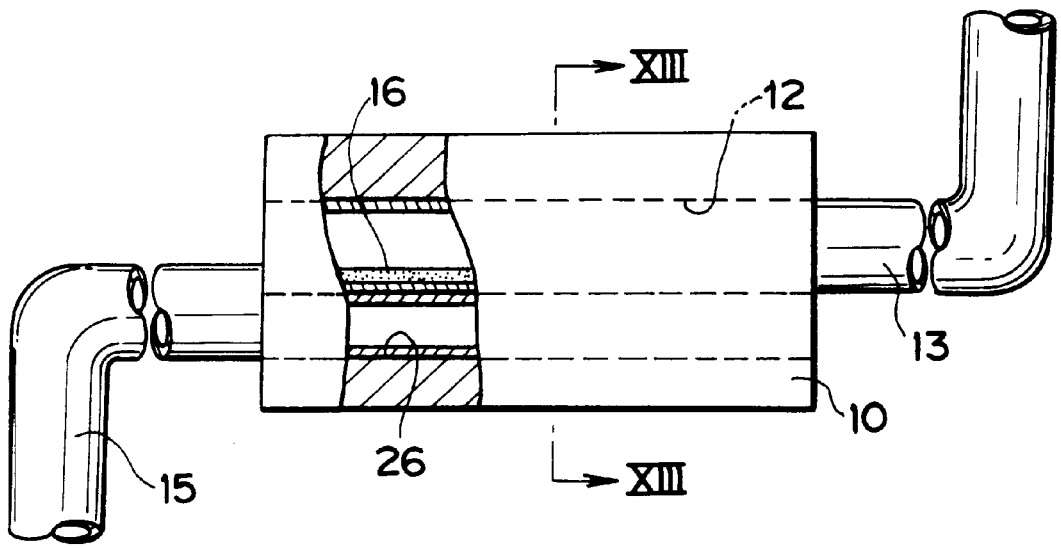
FIG. 12 is a partially cut-away schematic view showing a second heat pipe having a recess.
Figure 13:
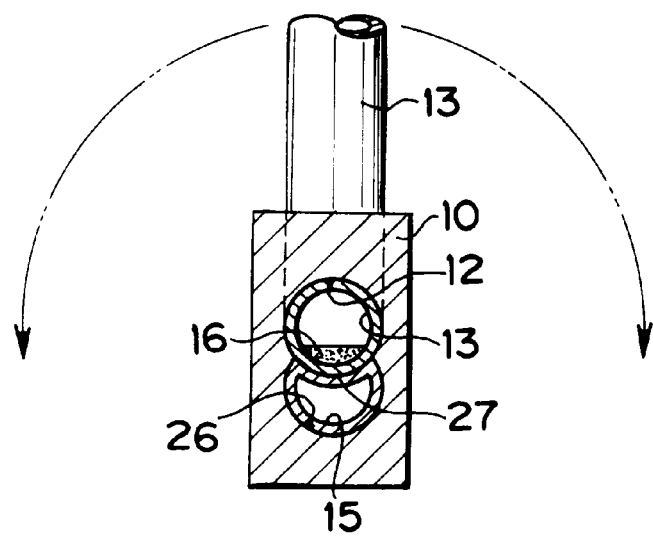
FIG. 13 is a sectional view taken along line XIII—XIII of FIG. 12.

Here will be described another shape of the second heat pipe 15. In connector 10, as shown in FIGS. 12 and 13, there is formed an arranging hole 26 in which two circular holes of a size are vertically juxtaposed in communication. In other words, the arranging hole 26 having a section of numeral 8 is extended to the two side faces in the connector 10. Here, this arranging hole 26 is made straight.

In the upper space of the arranging hole 26, there is inserted one end portion of the first heat pipe 13 from the right side of FIG. 12. On the other hand, the second heat pipe 15 is inserted into the lower space of the arranging hole 26 from the left side of FIG. 12. The second heat pipe 15 is fixed in the connector 10 by adhesion means, for example. Here, the leading end portions of the first heat pipe 13 and the second heat pipe 15 are so arranged inside of the edges of the arranging hole 26 as may not project from the connector 10.

In the upper face of the portion, as fitted in the connector 10, of the second heat pipe 15, there is formed a recess 27 which is extended in the axial direction of the container. This recess 27 is formed into such a curved arcuate shape as to match the sectional shape of the container of the first heat pipe 13. In other words, the radius of curvature of the recess 27 is set to a value substantially equal to that of the lower portion of the first heat pipe 13.

Thus, the lower portion of the container of the first heat pipe 13 is fitted along the recess 27 in the arranging hole 26 of the connector 10. Moreover, the first heat pipe 13 is not fixed with respect to the second heat pipe 15 and the arranging hole 26. Therefore, the first heat pipe 13 and the connector 10 can freely turn on the center axis of the first heat pipe 13. As a result, the connector 10 is constructed to turn on the center axis with the first heat pipe 13 closely contacting with the recess 27, as the display 7 is erected/inclined. In other words, the recess 27 and the first heat pipe 13 are held in close contact no matter what position the display 7 might take.

As a result, the connected portion between the first heat pipe 13 and the second heat pipe 15 is not a linear contact but a facial contact so that the heat resistance between the first heat pipe 13 and the second heat pipe 15 is low. Moreover, the first heat pipe 13 or a member for receiving the heat is arranged over the second heat pipe 15 or a member for releasing the heat so that the heat transfer is excellent at the connected portion between the first heat pipe 13 and the second heat pipe 15.

Figure 14:
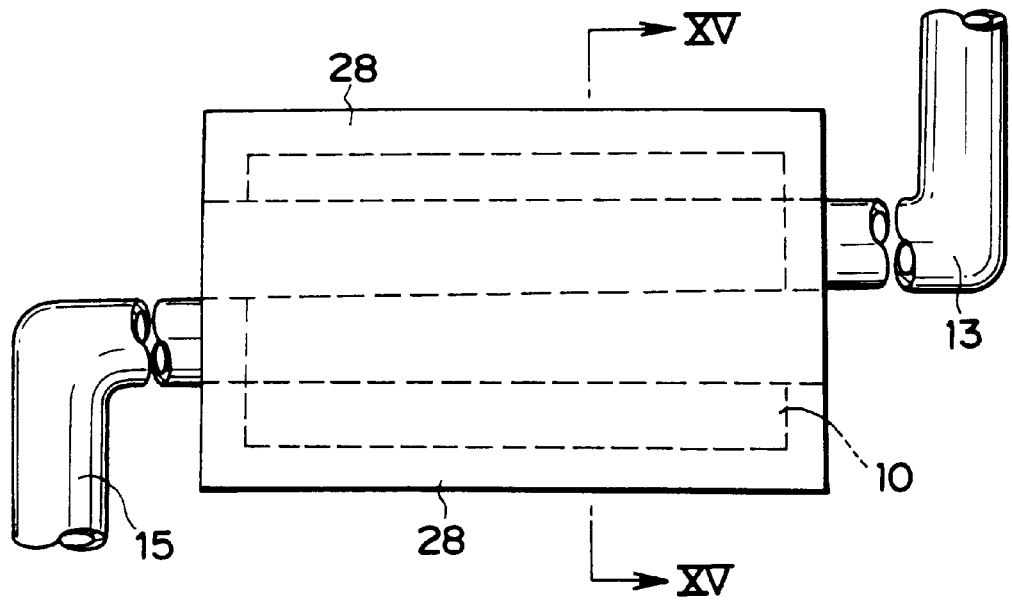
FIG. 14 is a schematic view showing a connector having a cover.
Figure 15:
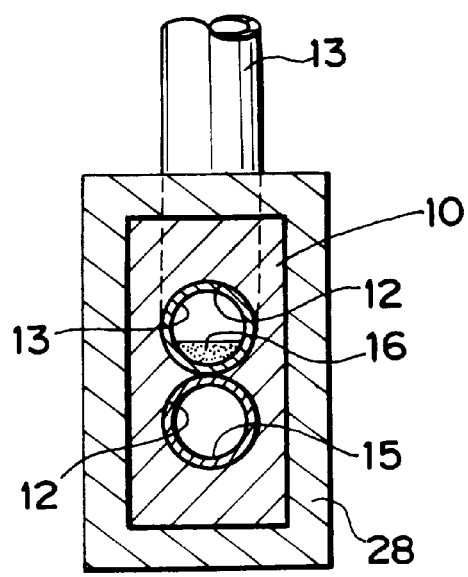
FIG. 15 is a sectional view taken along line XV—XV of FIG. 14.

Here will be described another example of the connector 10. As shown in FIGS. 14 and 15, the portion of the surface of the connector 10 excepting the hole 12 is sheathed with a cover 28 which is made of plastics having a higher heat insulation than that of the metal making the connector 10. Specifically, this cover 28 also has a circular hole of the same size as that of the hole 12 of the connector 10 so that it may not check the turning action of the first heat pipe 13.

Figure 4:
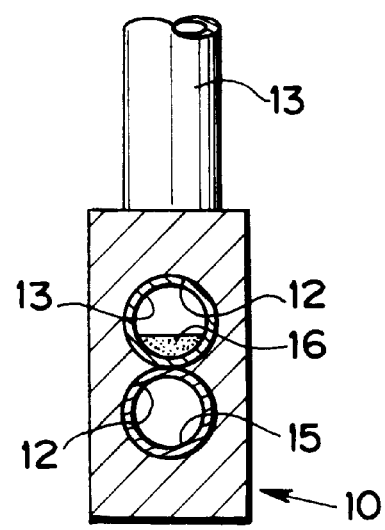
FIG. 4 is a sectional view taken along line IV—IV of FIG. 3.
Figure 5:
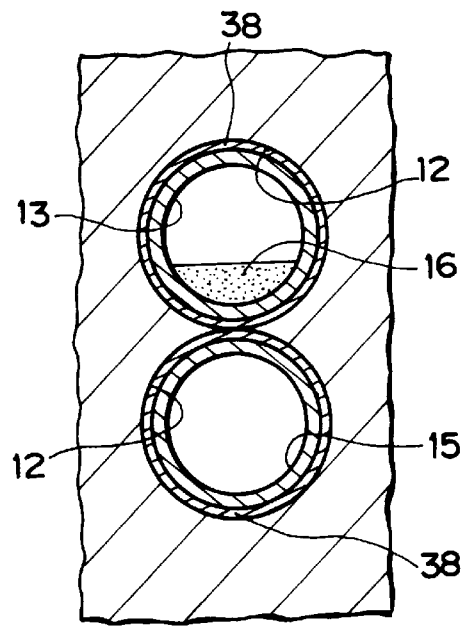
FIG. 5 is a sectional view showing an arranging relation among individual heat pipes, a thermal joint and the connector.

According to the construction described above, therefore, the connector 10 is sheathed with and thermally insulated by the cover 28 so that the heat transfer between the first heat pipe 13 and the second heat pipe 15 is more efficient than the connector 10 having the construction shown in FIGS. 3 and 4.

Figure 16:
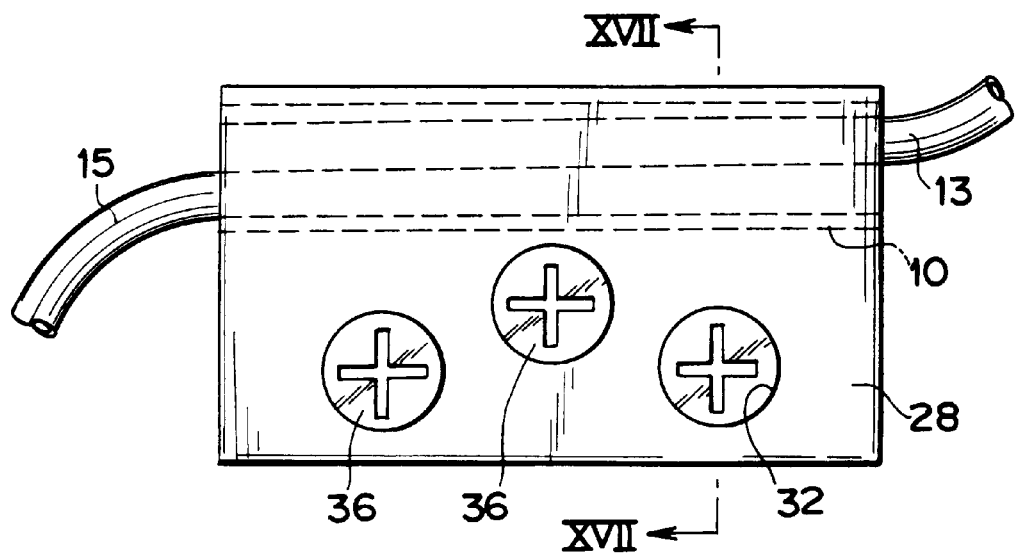
FIG. 16 is a schematic view showing a connector having bolts and nuts.
Figure 17:
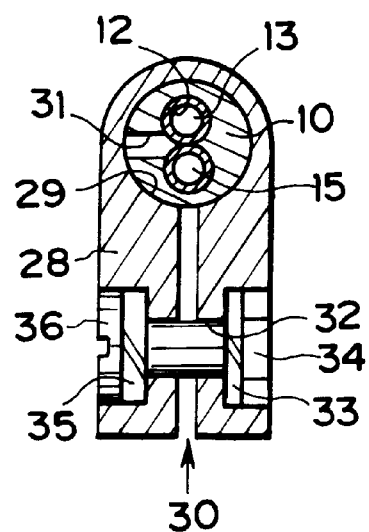
FIG. 17 is a sectional view taken along line XVII—XVII of FIG. 16.

Here will be described still another example of the connector 10. As shown in FIGS. 16 and 17, the cover 28 is formed to have a U-shaped section including a clamp 29 forming a column-shaped space and a slit 30 extended downward from the clamp 29. In the clamp 29, there is snugly inserted a deformed cylindrical connector 10. In this connector 10, here are formed two circular holes 12 of an internal diameter, which are vertically juxtaposed to each other. These holes 12 are individually extended linearly to the left and right side faces of the connector 10. In the connector 10, moreover, there is formed a straight slit 31 which is extended from a portion of the outer circumference of the connector 10 to connect the holes 12.

One end portion of the second heat pipe 15 is inserted from the left side of FIG. 16 into the hole 12, as positioned below. On the other hand, one end portion of the first heat pipe 13 is inserted from the right side of FIG. 16 into the hole 12, as positioned above. As a result, the first heat pipe 13 and the second heat pipe 15 are so held in the connector 10 as can turn on the center axis with their containers closely contacting with each other at their side faces. Here, the leading end portions of the individual heat pipes 13 and 15 are arranged inside of the left and right side faces of the cover 28.

In this cover 28, there are formed three communication holes 32 which are extended to the left and right of FIG. 17 through the slit 30. These communication holes 32 are formed to have a smaller internal diameter at their longitudinal intermediate portions than at the two end portions. Nuts 34 are arranged through compression washers 33 at the right side portions, as seen in FIG. 17, of the individual communication holes 32. Into the left side portions of the individual communication holes 32, on the other hand, there are inserted bolts 36 through compression washers 35. These bolts 36 and the nuts 34 are individually fastened to each other. In short, the bolts 36 and the nuts 34 correspond to a fastening jig of the present invention.

As the bolts 36 are fastened, the gap of the slit 30 of the cover 28 is narrowed to reduce the internal diameter of the clamp 29. Then, the gap of the slit 31 of the connector 10 is narrowed to compress the connector 10 radially. As a result, the outer circumferences of the individual heat pipes 13 and 15 are fastened by the inner circumferences of the individual holes 12. When the bolts 36 are loosened, on the other hand, the connector 10 is righted from its deflected state to lighten the forces for fastening the individual heat pipes 13 and 15. In short, the fastening degrees of the individual heat pipes 13 and 15 by the connector 10 can be finely adjusted by the bolts 36. In other words, the sliding resistance accompanying the turning actions of the individual heat pipes 13 and 15 can be finely adjusted if the fastening forces of the bolts 36 and the nuts 34 are adjusted.

Figure 18:
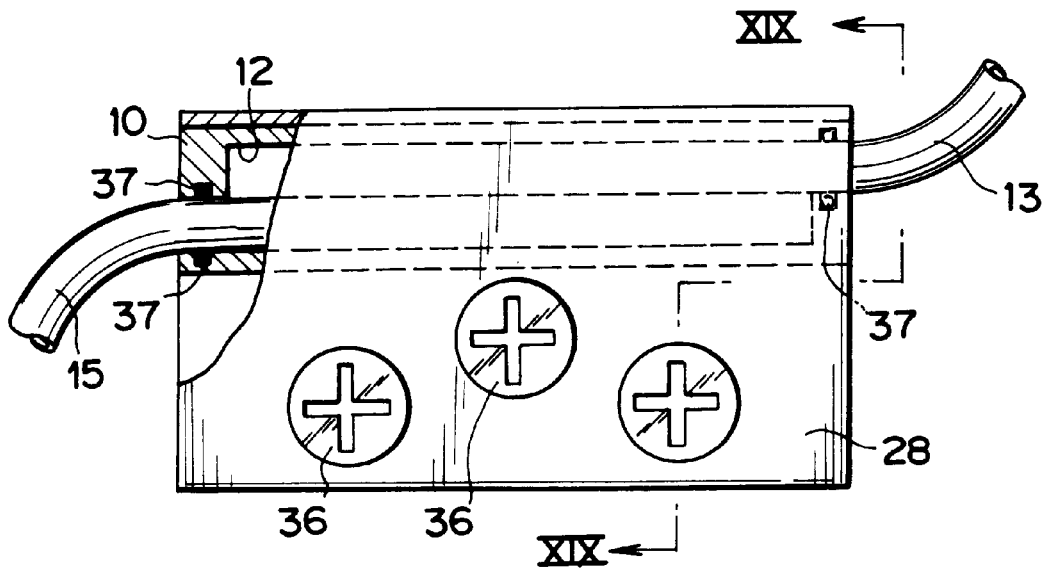
FIG. 18 is a schematic view showing a cover having an O-ring.
Figure 19:
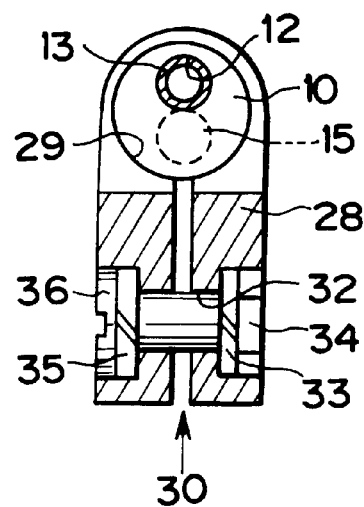
FIG. 19 is a sectional view taken along line XIX—XIX of FIG. 18.

Here will be enumerated still another example of the connector 10. As shown in FIGS. 18 and 19, the circular hole 12, as located above, is extended through the connector 10 but fails to reach the left side face thereof, as seen in FIG. 18. On the other hand, the circular hole 12, as located below, is extended through the connector 10 but fails to reach the right side face, as seen in FIG. 18.

Between the two side face portions of the connector 10 and the leading end faces of the individual holes 12, there are fitted O-rings 37 of rubber, which are fitted in the inner circumferences of the individual holes 12. Thus, the connector 10 is equipped at its individual side face portions with the O-rings 37. These O-rings 37 are provided for preventing the air from stealing into the gaps between the holes 12 and the individual heat pipes 13 and 15. Here, this connector 10 is not provided with any slit for providing the communication between the holes 12. The remaining construction is substantially identical to that of the connector shown in FIGS. 16 and 17.

When the bolts 36 are fastened, the gap of the slit 30 is narrowed to reduce the internal diameter of the clamp 29. Accordingly, the connector 10 is radially compressed, and the individually O-rings 37 are radially deformed to narrow the gaps between the outer circumferences of the individual heat pipes 13 and 15 and the inner circumferences of the holes 12. In other words, the individual heat pipes 13 and 15 are fastened by the individual holes 12. As a result, there are raised the sliding resistance which accompany the turning actions of the individual heat pipes 13 and 15. Then, the individual O-rings 37 are elastically deformed to avoid the radial deformations of the individual heat pipes 13 and 15.

When the bolts 36 are loosened, on the other hand, the deformed connector 10 is radially righted to lighten the force of the connector 10 for fastening the individual heat pipes 13 and 15. Then, the deflected O-rings 37 are righted to prevent the air acting a heat resistance from stealing into the gaps between the holes 12 and the individual heat pipes 13 and 15.

Figure 20:
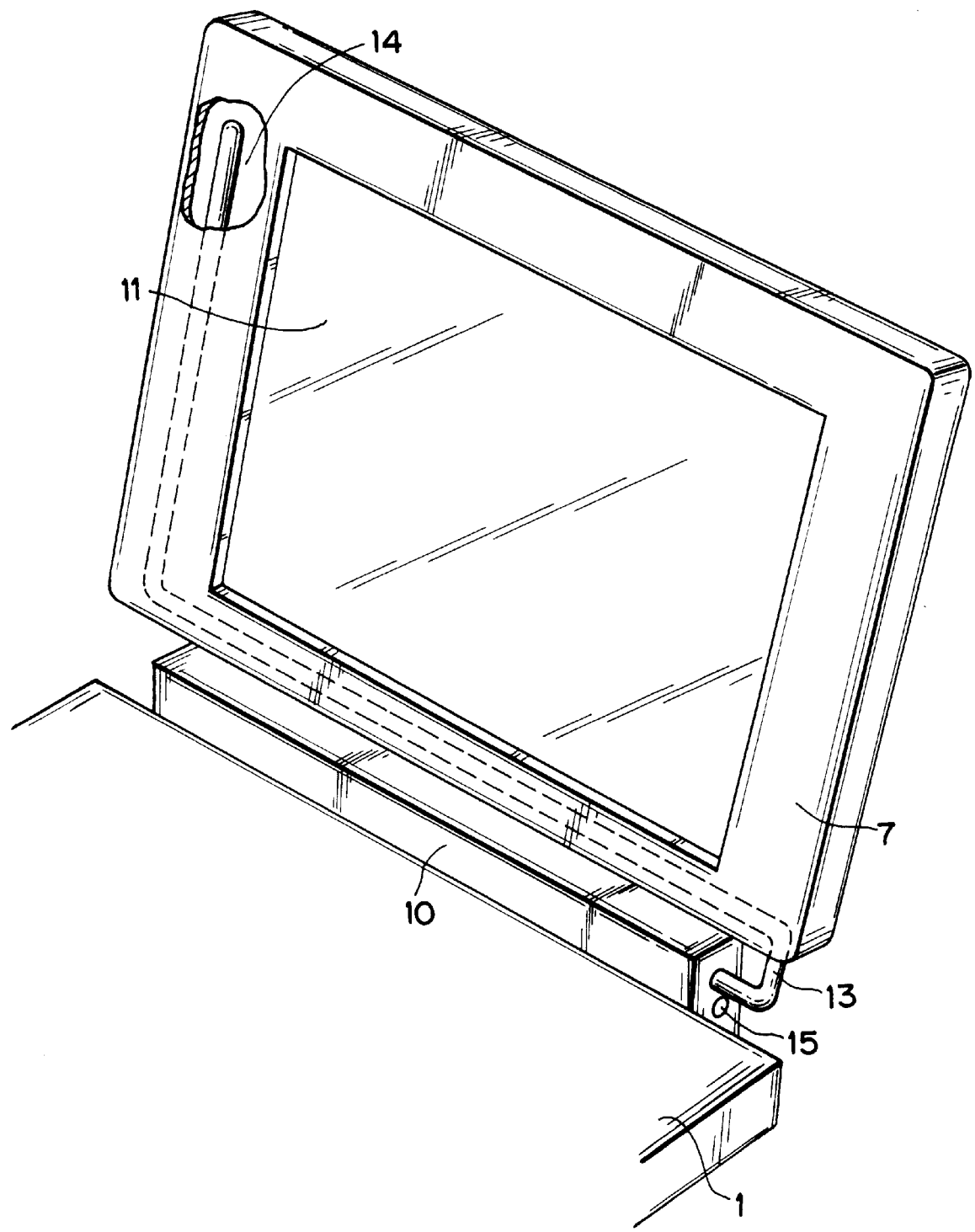
FIG. 20 is a perspective view showing a notebook personal computer having a hinge constructed of the first heat pipe and the connector.

Here will be described an embodiment in which the first heat pipe and the connector act as the hinge. Into the hole 12 positioned above, as shown in FIG. 20, there is inserted from the right side one end portion of the first heat pipe 13. This first heat pipe 13 is so held in the connector 10 as can freely rotate on its center axis. This connector 10 is so attached along the edge portion to the personal computer body 1 that the end portion of the first heat pipe 13 held thereby is arranged in a horizontal position with respect to the bottom portion of the personal computer body 1. Here, the personal computer body 1 and the display 7 are equipped with neither the support blocks 5 and 8 nor the hinge pins 6, that is, not the hinge 9 for supporting the display 7 to be erected/inclined.

The other end portion of the first heat pipe 13 inserted from the lower edge, as seen in FIG. 20, of the personal computer body 1 into the personal computer body 1 and is extended along the lower edge to the left of FIG. 20 such that it is arranged along the left edge, as seen in FIG. 20, of the electromagnetic shielding sheet 14. Moreover, the first heat pipe 13 is firmly attached to the electromagnetic shielding sheet 14 by the not-shown suitable means. In short, the display 7 is so supported by the personal computer body 1 as to be erected/inclined by the relative rotation between the connector 10 and the first heat pipe 13. In other words, the first heat pipe 13 and the connector 10 act as the hinge 9.

According to the cooling device for the notebook personal computer described above, therefore, the support blocks 5 and 8 and the hinge pins 6 can be dispensed with. This raises an advantage that the construction of the display 7 and the personal computer body 1 can be made simpler than that shown in FIG. 1.

What is claimed is:

1. A cooling device for a notebook personal computer which has a personal computer body accommodating an exothermic electronic element and a display hinged in an openable/closable manner to said personal computer body through a hinge mechanism, comprising:
    a first heat pipe having a first end portion arranged along said display and a second end portion arranged in parallel with a center line of rotation of said hinge mechanism;
    a second heat pipe having a first end portion arranged on said electronic element in a heat transferable manner and a second end portion arranged in thermal contact with the second end portion of said first heat pipe; and
    a connector defining a first hole having an axis and configured to receive said second portion of said first heat pipe, a second hole having an axis different from said axis of said first hole and configured to receive said second portion of said second heat pipe, said first and second holes communicating with each other;
    wherein at least one of said second end portions is positioned on the center line of rotation of said hinge mechanism.

2. A cooling device according to claim 1, wherein said display comprises a metal sheet, and wherein said first heat pipe is attached to said metal sheet in a heat transferable manner.

3. A cooling device according to claim 2, wherein said metal sheet is configured to provide electromagnetic shielding.

4. A cooling device according to claim 1, wherein said display comprises a planar image display screen, and wherein said first heat pipe is arranged along a periphery of said image display screen.

5. A cooling device according to claim 1, wherein said display comprises:
    a cavity portion defining a cavity for an air flow;
    an inlet portion defining an air inlet opening formed in a lower side portion of the display and communicating with said cavity; and
    an outlet portion defining an air outlet opening formed in an upper side portion of the display and communicating with said cavity;
    wherein the first end portion of said first heat pipe is arranged in said cavity.

6. A cooling device according to claim 1, further comprising:
    a pasty thermal joint between the second end portions of said first and second heat pipes and said connector.

7. A cooling device according to claim 1, wherein the second end portion of said first heat pipe and the second end portion of said second heat pipe are in direct contact with each other.

8. A cooling device according to claim 7, wherein that one of said first and second heat pipes having its second end portion not positioned on the center line of rotation of said hinge mechanism comprises a recess configured to form a facial contact between the first and second heat pipes.

9. A cooling device according to claim 8, wherein said recess is along an axial direction of said first and second heat pipes.

10. A cooling device according to claim 7, further comprising:
    a pasty thermal joint between said first heat pipe and said second heat pipe.

11. A cooling device according to claim 1, wherein said connector comprises a heat insulating member configured to sheath an outer periphery thereof in a heat insulating manner.

12. A cooling device according to claim 11, wherein said heat insulating member comprises a fastening device configured to fasten said connector and said first and second heat pipes.

13. A cooling device for a notebook personal computer which has a personal computer body accommodating an exothermic electronic element and a display hinged in an openable/closable manner to said personal computer body, comprising:
- a first heat pipe having a first end portion attached integrally to said display;
- a second heat pipe having a first end portion arranged on said electronic element in a heat transferable manner; and
- a connector configured to hold a second end portion of one of said heat pipes relatively rotatable such that said second end portion is arranged on an axis for opening/closing said display, said connector being integrated with one of said personal computer body and said display, said connector being configured to house a second end portion of the heat pipe not relatively rotatable so as to keep said first and second heat pipe in thermal contact;
- wherein said connector and said heat pipe, having the relatively rotatable second end portion, form a hinge between said personal computer body and said display, and
- the second end portion of said first heat pipe and the second end portion of said second heat pipe are in direct contact with each other.

14. A cooling device according to claim 13, wherein that one of said first and second heat pipes, having its second end portion not relatively rotatable comprises a recess configured to form a facial contact between the first and second heat pipes.

15. A cooling device according to claim 14, wherein said recess is along an axial direction of said first and second heat pipes.

16. A cooling device according to claim 13, further comprising:

a pasty thermal joint between said first heat pipe and said second heat pipe.

17. A cooling device according to claim 13, wherein said connector comprises a heat insulating member configured to sheath an outer periphery thereof in a heat insulating manner.

18. A cooling device according to claim 17, wherein said heat insulating member comprises a fastening device configured to fasten said connector and said first and second heat pipes.

* * * * *